United States Patent [19]

Bauman et al.

[11] 4,348,296

[45] Sep. 7, 1982

[54] CRYSTALLINE LITHIUM ALUMINATES

[75] Inventors: William C. Bauman; John M. Lee; John L. Burba, III, all of Lake Jackson, Tex.

[73] Assignee: The Dow Chemical Company, Midland, Mich.

[21] Appl. No.: 217,611

[22] Filed: Dec. 18, 1980

[51] Int. Cl.$^3$ ...................... B01D 15/04; C01D 15/00
[52] U.S. Cl. ........................................ 252/184; 55/67; 55/386; 210/663; 423/179.5; 423/181; 521/28
[58] Field of Search .................... 252/184; 55/67, 386; 210/198.2, 663; 423/179.5, 181; 521/78

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,159,311 | 6/1979 | Lee et al. | 423/181 |
| 4,221,767 | 9/1980 | Lee et al. | 423/179.5 |
| 4,284,727 | 8/1981 | Boros et al. | 521/28 |

*Primary Examiner*—Irwin Gluck
*Attorney, Agent, or Firm*—W. J. Lee

[57] ABSTRACT

Porous substrates containing seeds of hydrous crystalline alumina are contacted with an aqueous solution of alkaline aluminate, thereby causing additional crystalline hydrous alumina to grow on the seeds within the pores of the substrate.

17 Claims, No Drawings

CRYSTALLINE LITHIUM ALUMINATES

BACKGROUND OF THE INVENTION

It is known, e.g., from U.S. Pat. Nos. 4,116,858 and 4,159,311, that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX.2Al(OH)_3$ which is useful in selectively recovering $Li^+$ values from aqueous solutions, e.g., Li-containing brines.

It is also known, e.g., from U.S. Pat. Nos. 4,116,856 and 4,221,767, that improvements in the above discussed formation of crystalline $LiX.2Al(OH)_3$ are found by reacting amorphous $Al(OH)_3$, or crystalline hydrous alumina (e.g., norstrandite, bayerite, gibbsite or mixtures of these) with LiOH to form $LiOH.2Al(OH)_3$ which is then reacted with LiX to form the crystalline $LiX.2Al(OH)_3$, where X is halide.

Various forms of alumina, $Al_2O_3$, are known, some of which occur as natural minerals, some of which are hydrated, and some of which are crystalline. The Handbook of Chemistry shows the following:

| Name | Crystalline Form | M.P. °C. | |
|---|---|---|---|
| aluminum oxide, $Al_2O_3$ | hex. col. | 2050 | |
| $\alpha$-$Al_2O_3$, corundum | trig;col.cr,n | 2015 | |
| $\gamma$-$Al_2O_3$, $\gamma$-alumina | wh.micro.cr.,n | tr.to alpha | |
| $Al_2O_3.3H_2O$, gibbsite, (hydrargillite) | monocl.,wh.cr. | tr.to $Al_2O_3.H_2O$ (Boehmite) | |
| $Al_2O_3.3H_2O$, bayerite | wh.micro.cr. | tr.to $Al_2O_3.H_2O$ (Boehmite) | |
| aluminum oxide, $Al_2O_3.xH_2O$ | amor.wh.pwd. | $-xH_2O$,tr. to $\gamma$-$Al_2O_3$ | |

Norstrandite is a crystalline hydrous alumina, as are gibbsite and bayerite.

The present process differs from the above previous lithium aluminate preparations in that $AlCl_3$ is used only once, to provide amorphous $Al(OH)_3$ in a substrate such as a macroporous ion exchange resin. Further loading of Al into the substrate pores is accomplished by crystallizing the alumina in the pores and growing the crystals in an alkaline aluminate solution.

SUMMARY OF THE INVENTION

Seeds of crystalline hydrous alumina, $Al(OH)_3$, are provided within the void spaces of a porous substrate, such as a macroporous resin, and additional crystalline hydrous alumina (e.g., gibbsite, bayerite, and/or norstrandite) is provided in the pores by treatment with an alkaline aluminate (e.g. $NaAlO_2.xNaOH$) solution. The so-formed crystalline hydrous alumina may then be converted to $LiX.2Al(OH)_3.nH_2O$ by reaction with a lithium salt, where X is an anion or negative-valence salt radical. Depending on the type of crystalline hydrous alumina formed, the crystalline unit cells may be of the 2-layer or 3-layer variety.

DETAILED DESCRIPTION

As used herein, the expressions "2-layer" and "3-layer" refer to the number of layers bounded on both sides by the aluminate layers into which the subject Li compounds are intercalated. As graphic illustrations to aid in describing the 2-layer and 3-layer intercalated crystals, the following representations of a unit cell are made:

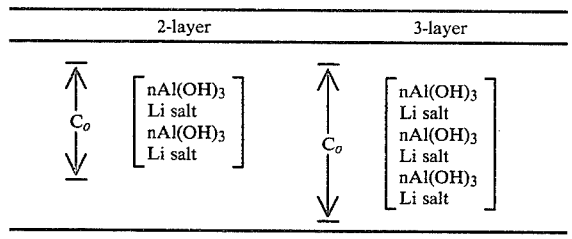

It will be realized, of course, that the crystals of lithium aluminates are normally present as aggregates or stacks of a plurality of unit cells rather than each unit cell standing as a separate physical entity.

2-layer $LiX.2Al(OH)_3.nH_2O$ is formed from gibbsite and a lithium salt (LiX) other than LiOH. The lithium salt concentration must be high (at least about 12-15% of LiCl, for example) and the temperature must be high, preferably close to the boiling point of the LiX solution. LiOH tends to solubilize the gibbsite and when it re-precipitates it forms 3-layer unit cells.

3-layer $LiX.2Al(OH)_3.nH_2O$ is formed from hydrous alumina and LiOH which forms crystalline $LiOH.2Al(OH)_3.nH_2O$ which can then be neutralized with an acid to form crystalline $LiX.2Al(OH)_3.nH_2O$, where X is the anion of the acid or of the lithium salt.

The porous substrate into which the crystalline hydrous alumina is loaded may be an inert material, such as an inorganic or organic material. For certain uses and reasons, the substrate is preferably a macroporous resin such as an ion exchange resin as taught in U.S. Pat. Nos. 4,116,858 and 4,116,856.

Once the substrate is loaded to satisfaction with the crystalline hydrous alumina, the composite is then ready for reaction with LiX, where X is a monovalent anion, such as $OH^-$, $Cl^-$, $Br^-$, $I^-$, $RCOO^-$, $OCl^-$, and the like, or may be divalent or trivalent, such as $SO_4^{--}$, $PO_4^{---}$, $R(COO)_2^{--}$, and the like.

The alkaline aluminate solution, e.g. $NaAlO_2.xNaOH$, may be prepared e.g. by dissolving commercial grade sodium aluminate, $NaAlO_2$, in water or may be prepared e.g. by reacting $Al(OH)_3$ with concentrated NaOH. Commercially available solutions of sodium aluminate can be used. When reacting crystalline $Al(OH)_3$ with concentrated NaOH it is preferred that the NaOH be of 50% concentration or higher, using a temperature which assures that the NaOH is a liquid. After the causticized $Al(OH)_3$, $NaAlO_2.xNaOH$, is prepared it is diluted during its use in the present invention. It is also preferred that there be about 1.1 to 1.5 mole of NaOH per mole of $Al(OH)_3$, since too much caustic tends to solubilize the crystalline hydrous alumina "seed" which is provided in the porous substrate to serve as precipitation sites for additional growth of crystalline hydrous alumina. The alkaline material may be KOH, but it is more costly.

In preparing a porous substrate having "seeds" of crystalline $Al(OH)_3$ within the small pores, it is not generally possible or practical to insert appreciable amounts of non-soluble crystals into the pores. Therefore, the seeds are best implanted by providing soluble Al values in the pores and then precipitating hydrous alumina in-situ within the pores. To accomplish this one may use a soluble Al salt, e.g., $AlCl_3$, and then alkalize the Al to insoluble Al(OH)$_3$. This freshly formed Al(OH)$_3$, being amorphous, is then treated in one of various ways to cause the Al(OH)$_3$ to crystallize.

When the substrate is a weak base anion exchange resin in its basic form, the preferred procedure for incorporating Al(OH)$_3$ seeds therein is to add an aqueous solution of AlCl$_3$ to where the amount of Cl$^-$ is about equivalent to the base capacity. After about 1 hour at room temperature (or somewhat shorter times if the mixture is warmed to not more than about 60° C.) most, if not all, of the Al values have been converted to Al(OH)$_3$; follow this by washing out excess AlCl$_3$, titrating to the resin-OH capacity with NaOH and wash again to substantially remove remaining chlorides.

When the substrate is any other porous structure (other exchange resins, polymers, inorganic inert materials, etc.) it is recommended that the seeds be implanted within the pores by using soluble Al (such as AlCl$_3$) which is precipitated in-situ using NH$_4$OH to form Al(OH)$_3$ in the pores. Excess AlCl$_3$, or Al(OH)$_3$ formed outside the pores, is easily washed away.

Once the "seed" of Al(OH)$_3$ is implanted in the pores of the substrate it may be conveniently crystallized as norstrandite, bayerite, or gibbsite, e.g., as follows:

1. To obtain norstrandite use a soluble amine, e.g., ethylene diamine (about 20% concentration) at about 50° C. overnight, then wash out the amine;
2. To obtain bayerite use NH$_3$ (about 1–30% in H$_2$O) at reflux temperature for 1–16 hours or more, then wash out excess NH$_4$OH;
3. To obtain gibbsite use aq. NaOH in an amount of about 0.1–0.5 moles of NaOH per mole of Al(OH)$_3$, boil for about 0.5 hour or more, and wash with H$_2$O. Sodium aluminate may be used instead of the NaOH.

Any of the above-described seeds of crystalline Al(OH)$_3$ may be used as growth sites for producing additional crystalline Al(OH)$_3$ by treatment with alkaline aluminate solution. If this additional treatment is done at less than about 50° C., the newly-precipitated crystalline Al(OH)$_3$ is principally norstrandite and/or bayerite; if done at greater than about 50° C. it is principally gibbsite. There is a tendency for the seed crystal to promote formation of additional Al(OH)$_3$ having the same crystal structure as the seed.

The NaAlO$_2$.xNaOH, once formed, and having a Na/Al ratio generally in the range of about 1.0–1.5, is then preferably used as a diluted aqueous solution of about 5–30% concentration by weight as the precursor for the additional Al(OH)$_3$ growth on the seed. The NaAlO$_2$.xNaOH solution is mixed with the seed-containing porous substrate. As the aluminum oxide values in the sodium aluminate become crystallized to Al(OH)$_3$, the pH climbs. Addition of more amorphous aluminum hydroxide lowers the pH by reforming additional sodium aluminate and solubilizes the amorphous alumina which then crystallizes out of the sodium aluminate and produces further growth of the seeded crystalline Al(OH)$_3$ which is, again, indicated by a rise in the pH. The step of adding NaAlO$_2$.xNaOH, or of adding amorphous alumina to reform depleted NaAlO$_2$.xNaOH, may be repeated a plurality of times until the relative speed of pH change is slowed, indicating that the pores are substantially filled with crystalline Al(OH)$_3$ and any additional formation of crystalline Al(OH)$_3$ is likely to take place outside the pores. If additional pre-formed NaAlO$_2$.xNaOH is added as a source of additional crystalline Al(OH)$_3$ it should be preceded by an amount of acid (pref. HCl) to neutralize the caustic already present from a previous addition of sodium aluminate; this prevents the caustic from building to a concentration which would re-solubilize the desired crystalline Al(OH)$_3$.

Another technique for causing additional precipitation of hydrous alumina onto the seed, is to add the alkaline aluminate in an amount sufficient to supply all, or even an excess, of the aluminate values expected to be precipitated; then by slow or incremental addition of an acid, e.g. HCl, the alkaline metal is converted to alkali metal salt (e.g. NaCl) thus decreasing the ratio of alkali metal hydroxide in the alkaline aluminate, thereby causing precipitation of the aluminate values and causing the seed to accrete this additional aluminate.

It can be seen, then, that by causticizing amorphous aluminum hydroxide to form sodium aluminate, the amorphous aluminum hydroxide is solubilized. The solubilized amorphous aluminum hydroxide, in the presence of the crystalline Al(OH)$_3$ seed, precipitates out as crystalline Al(OH)$_3$ and the seed accrues in size.

The reaction of LiX (i.e. a lithium salt or lithium compound) with the crystalline hydrous alumina is performed using an aqueous solution of the LiX and employing, preferably, an elevated temperature. It is best if the LiX is a concentrated solution and the temperature is at or near the boiling point. Weak solutions of LiX and/or lower temperatures of reaction are less effective in obtaining a high degree of the desired intercalation in a reasonable length of time.

The term "intercalation" is used to indicate that the reaction of the LiX with the crystalline hydrous alumina hydroxide creates LiX.2Al(OH)$_3$.nH$_2$O crystals wherein the LiX moiety lies between layers of the hydrous alumina hydroxide and, in fact, causes an expansion of the hydrous alumina crystal lattice. The LiX can be substantially leached out, but so long as a percentage of it remains, say about 50% of the possible amount, the crystal lattice remains expanded and the amount of intercalated LiX can be replenished until the lattice is again "loaded" with LiX.

The advantages of the present method, and of using NaAlO$_2$.xNaOH as the source of hydrous alumina to build crystalline Al(OH)$_3$ in the substrate, are contemplated as being:

1. Crystalline Al(OH)$_3$ (such as gibbsite, bayerite, norstrandite and mixtures of these) can, by being combined with NaOH, be used and the substrate substantially loaded with the crystalline material using fewer steps than shown, e.g., in U.S. Pat. Nos. 4,116,856 and 4,116,858;
2. Because it is not necessary to dry the substrate (such as an ion exchange resin) after the first loading step, osmotic shock is substantially decreased and substrate breakage or decrepitation is substantially avoided;
3. Because the composite is neutralized only once, aluminum loss due to neutralization problems is minimized;
4. One may selectively prepare 2-layer lithium aluminates or 3-layer lithium aluminates;
5. Having the hydrous alumina present in the porous substrate as crystalline Al(OH)$_3$ rather than amorphous Al(OH)$_3$ is beneficial in providing optimum loading of LiX, thereby forming crystalline LiX.2Al(OH)$_3$.nH$_2$O in a more consistent and expeditious manner.

EXAMPLE 1

Lithium Aluminate from Gibbsite (a) 525 ml of DOWEX MSC-1 ® (10% divinylbenzene) is stirred into an equal volume of 29% $AlCl_3$ solution. The resin is filtered so that the excess $AlCl_3$ solution is removed from the resin. The resin is dried to free flowing resin with dry $N_2$. The resin is then stirred into 600 ml of aqueous 30% $NH_3$ solution. The mixture is washed. The resin is contacted with an excess of brine to convert $RSO_3NH_4$ to $RSO_3Na$. The resin is then filtered to remove all of the solution from the beads. The resin is then added to 456 g of $H_2O$ and 230 g of $NaAlO_2.\frac{1}{2}NaOH$ solution (from gibbsite and 50% NaOH). The mixture is stirred and heated to 75°–80° C. for about one hour. The temperature is reduced to about 70° C. At this point, five 25 g additions of amorphous $Al(OH)_3$ are added at 10 minute intervals. After the last addition, the heat and stirrer are turned off and the resin mixture is allowed to set overnight. The final aluminum content of the washed resin is approximately 3.92 mmole of Al/ml of resin. X-ray diffraction analysis shows very crystalline gibbsite is present in the resin.

(b) Conversion to 2 layer lithium aluminate. The resin is refluxed in 30% aqueous LiCl solution for at least 4 hours. The product is DOWEX MSC-1 ® resin containing 2 layer $LiCl.2Al(OH)_3.nH_2O$.

(c) Preparation of 3 layer $LiCl.2Al(OH)_3.nH_2O$ in a porous substrate via gibbsite. 110 ml of DOWEX MSC-1 ® resin containing gibbsite, prepared as described above, is heated with 110 ml of a solution containing 8.31 g of LiCl and 3.52 g of $LiOH.H_2O$. The slurry is stirred at a temperature of 75° C. After 5 minutes the pH of the system should drop from pH 10 to pH 9 to 9.5. 75 ml of 1 N NaOH are added and the resin is heated for another hour. The resin is placed in a 95° C. oven for 12 hours. X-ray analyses of samples taken periodically show a decrease in the amount of gibbsite with a corresponding increase in the amount of $LiCl.2Al(OH)_3.nH_2O$.

The resin is then washed and then neutralized with HCl in a solution containing $NH_4Cl$ and LiCl. Neutralization to a pH of 5.6 (at room temperature) requires about 220 milliequivalents of HCl. The LiCl.LiOH.-gibbsite reaction will also take place at 25° C.

(d) 225 ml of DOWEX MSC-1 ® resin containing gibbsite (3.7 mmoles of Al/ml of resin) is placed in a stainless steel beaker with 275 ml of $H_2O$ and 35 g of $LiOH.H_2O$. The mixture is heated to 80° C. X-ray analysis shows that all of the gibbsite is converted to 3 layer $LiOH.2Al(OH)_3.nH_2O$ in about 30 minutes. The resin is neutralized with HCl. This reaction also occurs at room temperature but at a much slower rate.

EXAMPLE 2

Preparation of 3 layer $LiCl.2Al(OH).nH_2O$ in a porous substrate via bayerite (a) 500 ml of DOWEX MWA-1 ®-Cl resin is poured into an equal volume of saturated aqueous $AlCl_3$ solution. The slurry is stirred without heating for 40 minutes. The resin is filtered by suction until all of the excess $AlCl_3$ solution is removed from the resin. The resin is then stirred into 500 ml of 30% $NH_3$ in $H_2O$ at room temperature. An exotherm from 25° to 30° C. is observed. The resin is stirred for a total of 20 minutes. The ammonia solution is poured off of the resin and the resin is allowed to set for about 16 hours at room temperature. X-ray analysis of the resin shows that bayerite has formed in the resin. There is still a large amount of amorphous $Al(OH)_3$ present. Aluminum analysis indicates that the resin contains 0.7 mmoles of Al/ml of resin at this point.

The resin is washed thoroughly so that the filtrate is clear. Even a small amount of crystalline $Al(OH)_3$ in the solution phase cannot be tolerated.

The resin and 230 ml of DI $H_2O$ are stirred and heated to 45° C. and 173 g of freshly prepared $NaAlO_2.xNaOH$ is added to the slurry. This mixture is reacted for 1 hour. From x-ray data it can be seen that the amorphous $Al(OH)_3$ content of the resin is decreased.

Four 216 g additions of amorphous $Al(OH)_3$ are added at 15 minute intervals. After the last addition, the resin is allowed to stand for about 16 hours. X-ray analysis of the product shows only well crystallized bayerite.

(b) 210 ml of the resin described above is neutralized with about 240 milliequivalents of HCl. The resin is then heated at 110°–115° C. in 250 ml of 30% LiCl solution for 1.5 to 3 hours. Very crystalline 3 layer $LiCl.2Al(OH)_3.nH_2O$ is the product. No further neutralization is necessary.

Bayerite in porous resin can also be converted to 3 layer lithium aluminate by reaction with LiOH or a mixture of LiCl and LiOH.

EXAMPLE 3

Growth of Nordstrandite in DOWEX MWA-1 ® resin.

500 ml of DOWEX MWA-1 ®-Cl resin is poured into an equal volume of 25% $AlCl_3$ solution. The mixture is stirred for about 30–40 minutes. The resin is then filtered to remove the excess $AlCl_3$ and stirred into 30% $NH_4OH$ solution. The resin is stirred for about 30 minutes and washed thoroughly with $H_2O$. The resin is successively treated with $NH_4OH$ and $H_2O$ until substantially all of the $Cl^-$ is removed. The resin is washed with DI $H_2O$ to remove all traces of $NH_4OH$.

The resin is then placed in a polyethylene bottle with an equal volume of 12% ethylenediamine and heated at 50° C. for 16 hours. X-ray shows the presence of nordstrandite.

The resin is then contacted with an equal volume of D.I. $H_2O$ and 230 g of fresh $NaAlO.\frac{1}{2}NaOH$ for one hour. Five 25 g additions of amorphous $Al(OH)_3$ are then added at 15 minute intervals. The resulting product is nordstrandite in the pores of DOWEX MWA-1 ® resin.

EXAMPLE 4

The modified method for high loading of crystalline hydrous alumina 3000 ml of DOWEX MWA-1 ® in the $OH^-$ form plus water to a total of 3750 ml was stirred as 147 g of anhydrous $AlCl_3$ were added. Stirring was continued for one hour as the pH slowly rose to pH5. The slurry was well washed with D.I. $H_2O$ until the effluent was almost colorless. The washed resin was re-slurried with 40 ml of 30% $NH_3$ and 155 ml of 50% NaOH to a pH 10.5. The resin was then washed on a filter.

A sample of 197 ml of the resin so prepared was slurried in $H_2O$ with 5.22 g of $NaAlO_2.xNaOH$ ($NaAlO_2.xNaOH$ is a solution of sodium aluminate made by dissolving 1960 g of gibbsite in 2100 ml 50% NaOH at 100° C.) The final volume of resin was 192 ml.

The resin was transferred to a one liter beaker and 299 g of NaAlO$_2$.xNaOH was added plus water to a total volume of about 540 ml. By means of a pump 36% HCl was metered into the stirred slurry at a rate of 1 ml/minute. The temperature rose to a maximum of 40° C. and it was maintained at 30°–40° C. during the course of the HCl addition. The pH decreased from about pH 14 down to pH 12.8. The pump was controlled by the pH and near the end was essentially in an on-off mode as the pH fluctuated. After 164 ml of 35% HCl had been added the slurry was well washed to yield 230 ml of resin which contained 4.63 mmole of Al/cc of resin. The Al was present as bayerite as determined by X-ray.

EXAMPLE 5

About 200 ml of DOWEX MWA-1 ®-Cl was treated at room temperature with a large excess of 25.5% AlCl$_3$. The resin is sucked dry on a filter funnel and dumped into 200 ml of 30% aqueous ammonia and stirred for 15 minutes. The resin is rinsed briefly with water and allowed to stand overnight at room temperature. It was titrated to stable 10.1 pH with 74 ml of N/1 NaOH. The resin was then washed until chloride free to give a settled volume of 166 ml. The resin was added to water to a total volume of 260 ml. 4.4 g of a sodium aluminate solution (1960 g of gibbsite dissolved in 2100 ml of 50% NaOH at 100° C.) was added. After one hour of stirring at room temperature an additional 70 g of sodium aluminate solution was added. After an additional 45 minutes of stirring at 30°–35° C., the pH had risen to 13.6. During the next hour four equal additions of amorphous Al(OH)$_3$ (100 g≡1 mol Al) of 9 g each were made. The pH held at 13.5–13.6. The supernatant solution was filtered and returned to the resin pot with a pH increase to 13.9. Two more 9 g additions of amorphous Al(OH)$_3$ were made during the next hour and then two more 9 g additions in the next 45 minutes. The washed resin, with a settled volume of 203 ml, showed an aluminum content of 4.5 mmole/ml.

The above examples are to illustrate the practice of the invention, but the invention is not limited to the particular examples shown.

We claim:

1. A process for growing crystalline hydrous alumina within the pores of a porous substrate, said process comprising
    providing a seed of crystalline hydrous alumina in said pores by the in-situ precipitation of soluble Al values, thereby forming amorphous hydrous alumina,
    converting the so-formed amorphous hydrous alumina to crystalline hydrous alumina by heating, and
    adding to the seed-bearing substrate on aqueous solution of an alkaline aluminate, thereby providing aluminum oxide values which grow additional quantities of crystalline hydrous alumina on the crystalline hydrous alumina seeds.

2. The process of claim 1 wherein the alkaline aluminate is sodium aluminate.

3. The process of claim 1 wherein the alkaline aluminate becomes diluted during its addition to the crystalline hydrous alumina.

4. The process of claim 1 wherein the alkaline aluminate comprises NaAlO$_2$.xNaOH where x is a numerical value of about 0.1 to 0.5.

5. The process of claim 1 wherein the production of the additional quantities of crystalline hydrous alumina is promoted by addition of an acid which forms a soluble salt with the alkali.

6. The process of claim 5 wherein the acid is HCl.

7. The process of claim 1 wherein the porous substrate is selected from the group consisting of inorganic, organic, polymeric and resinous materials.

8. The process of claim 1 wherein the porous substrate is a macroporous ion exchange resin.

9. The process of claim 1 wherein there is provided the additional procedure of
    reacting the so-formed crystalline hydrous alumina with LiOH to form crystalline LiOH.2Al(OH)$_3$.nH$_2$O.

10. The process of claim 1 wherein there is provided the additional procedure of
    reacting the so-formed crystalline hydrous alumina with lithium salt, LiX, to form crystalline LiX.2Al(OH)$_3$.nH$_2$O where X is the anion of the lithium salt.

11. The process of claim 10 wherein the LiX is LiCl.

12. A porous substrate containing crystalline hydrous alumina with its pores when prepared by the process of claim 1.

13. The composition of claim 12 when the crystalline hydrous alumina is gibbsite.

14. The composition of claim 12 when the crystalline hydrous alumina is norstrandite.

15. The composition of claim 12 when the crystalline hydrous alumina is bayerite.

16. Crystalline LiOH.2Al(OH)$_3$.nH$_2$O when prepared in accordance with claim 9.

17. Crystalline LiOH.2Al(OH)$_3$.nH$_2$O when prepared in accordance with claim 10.

* * * * *

UNITED STATES PATENT AND TRADEMARK OFFICE
CERTIFICATE OF CORRECTION

PATENT NO. : 4,348,296
DATED : September 7, 1982
INVENTOR(S) : William C. Bauman, John M. Lee and John L. Burba III It is certified that error appears in the above—identified patent and that said Letters Patent is hereby corrected as shown below:

Col. 5, line 62, change "$AlCl_3$solution" to --$AlCl_3$ solution--.

Col. 8, line 4, Claim 1, change "on" to --an--.

Signed and Sealed this

Eighth Day of March 1983

[SEAL]

Attest:

GERALD J. MOSSINGHOFF

Attesting Officer — Commissioner of Patents and Trademarks